July 10, 1962 W. J. DORNHOEFER 3,044,046
TELEMETERING SYSTEM
Filed Aug. 1, 1957 6 Sheets-Sheet 1

July 10, 1962  W. J. DORNHOEFER  3,044,046
TELEMETERING SYSTEM
Filed Aug. 1, 1957  6 Sheets-Sheet 2
FIG. 2
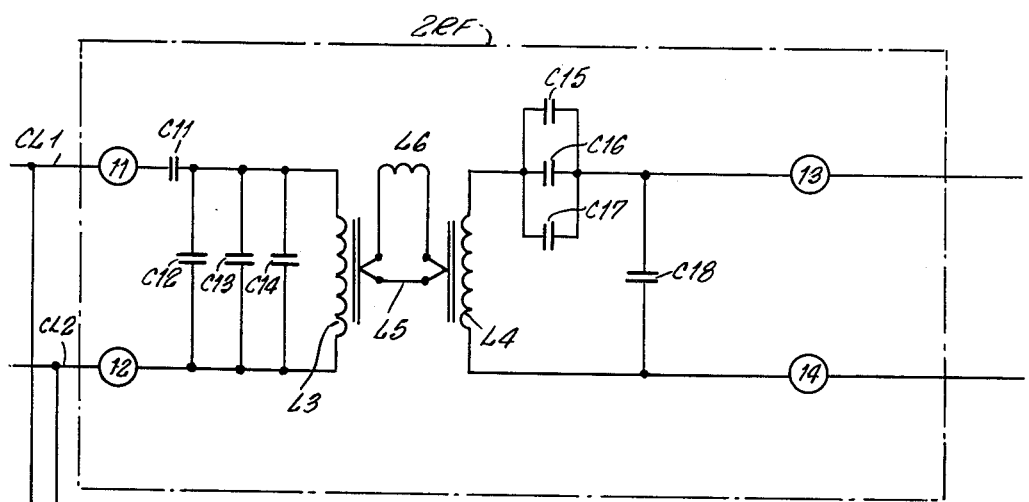
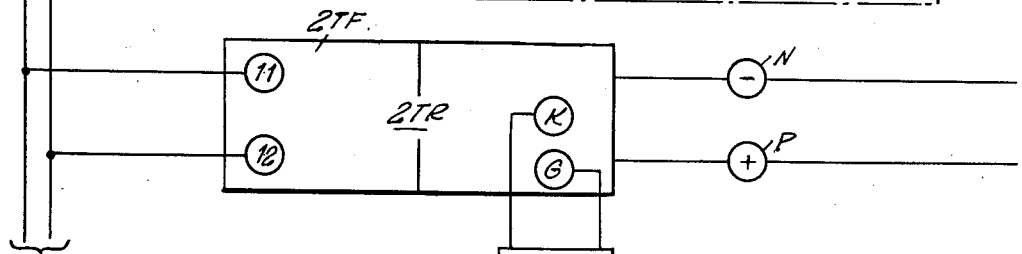
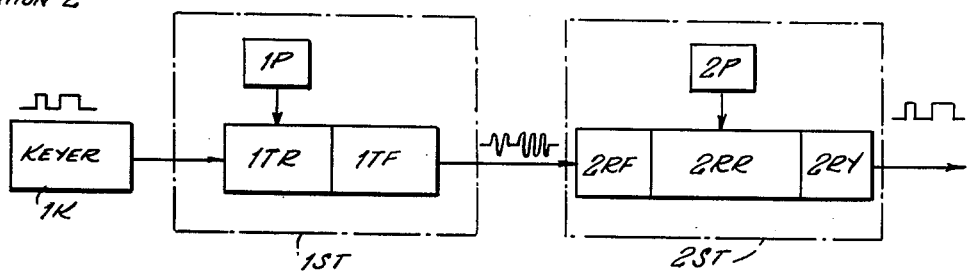
FIG. 5
INVENTOR.
Warren J. Dornhoefer July 10, 1962 W. J. DORNHOEFER 3,044,046
TELEMETERING SYSTEM
Filed Aug. 1, 1957 6 Sheets-Sheet 3

July 10, 1962 W. J. DORNHOEFER 3,044,046
TELEMETERING SYSTEM
Filed Aug. 1, 1957 6 Sheets-Sheet 4

July 10, 1962  W. J. DORNHOEFER  3,044,046
TELEMETERING SYSTEM
Filed Aug. 1, 1957  6 Sheets-Sheet 6
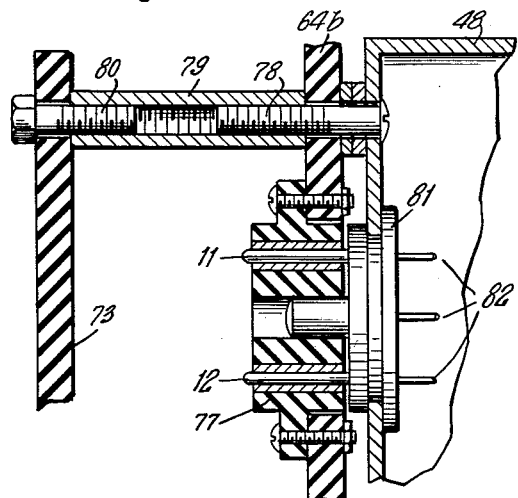
FIG. 12
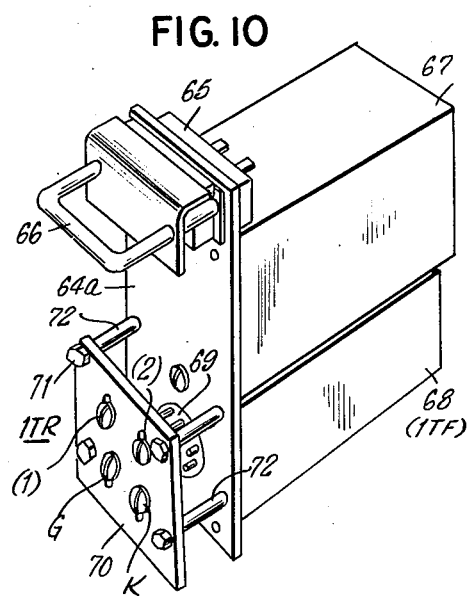
FIG. 10
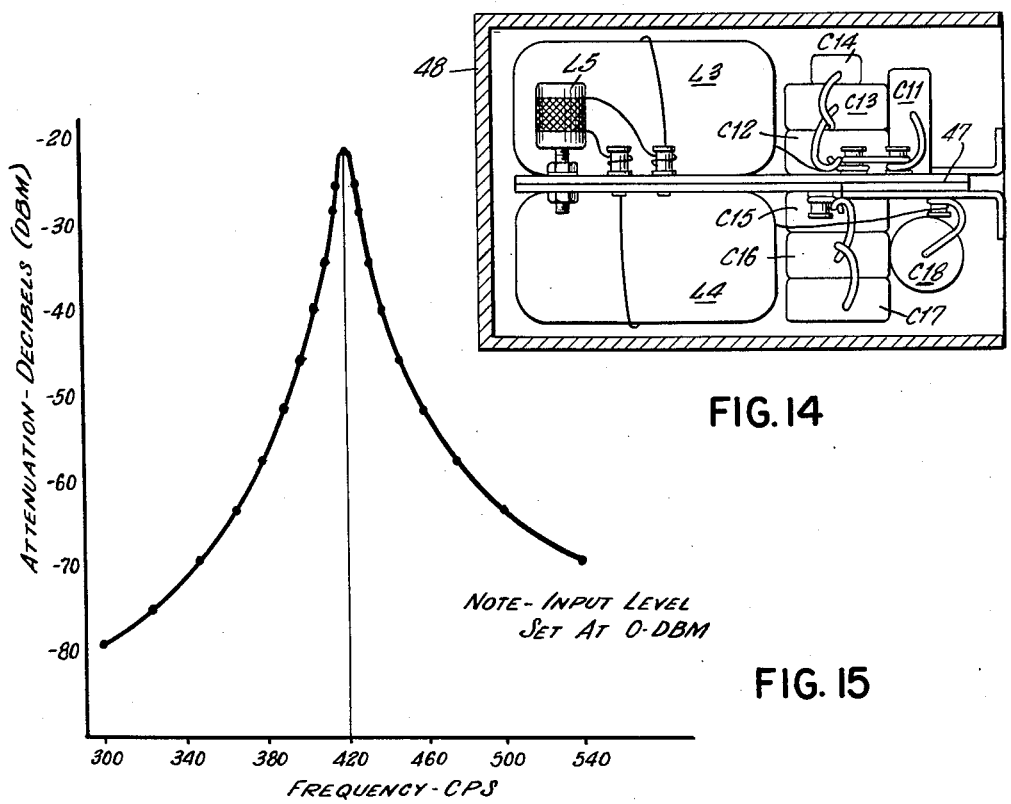
FIG. 14
FIG. 15
NOTE — INPUT LEVEL SET AT 0-DBM

United States Patent Office 3,044,046
Patented July 10, 1962

3,044,046
TELEMETERING SYSTEM
Warren J. Dornhoefer, Groton, Mass., assignor to The Warren Manufacturing Company, Inc., Littleton, Mass., a corporation of Massachusetts
Filed Aug. 1, 1957, Ser. No. 675,772
6 Claims. (Cl. 340—184)

My invention relates to multiplex carrier-frequency telemetering systems and system components of the tone-frequency type for operating a number of telemetering channels over a single transmission medium to effect remote instrumentation and control of various functions such as temperature, pressure, rate of flow, level, valve position, voltage, current, power, and other physical magnitudes. More specifically, my invention concerns telemetering systems that convert circuit opening and closing periods of variable duration into presence and absence of any one of a number of different audio-frequency waves or "tones" of equivalent duration which are transmitted over wire, radio or microwave facilities to a remote station where they are reconverted into their equivalent circuit opening and closing periods.

It is an object of the invention to provide a multi-channel tone telemetering system that affords reliable and trouble-free operation and frequency separation with a frequency spacing of about 120 c.p.s. within a given range of audio-frequencies, thus affording simultaneous transmission up to 18 channels within the range of 420 to 2460 c.p.s., and that secures exceptional reliability with the aid of electrically simple and mechanically compact components of minimized space requirements and modular design to provide for ease in manufacturing, assembly, interchangeability, installation, rearrangement or expansion.

Another object of the invention is to provide in such systems an on-off mode of operation of improved accuracy which, despite simplicity and minimized number of system components, is reliably free of cross-keying between any of the channels as may be operating simultaneously; and it is also an object to prevent changes in ambient temperature or fluctuation in energizing line voltage from appreciably impairing the frequency stability.

Still another object of the invention, akin to the above-mentioned aim toward simple and small components, is to permit using in such systems a relatively simple power supply which, energized from an alternating-current utility line, provides rectified energizing current with an appreciable voltage ripple, yet to devise the telemetering transmitter and receiver units in such a manner that they are inherently capable of suppressing or obviating detrimental effects of such ripple voltage upon the quality of the tone-frequency transmission.

A further subsidiary object of my invention is to provide the transmitter and receiver units of the tone-telemetering system with oscillatory-circuit components or filters that combine extreme sharpness, selectivity and a high-quality factor with the aid of elementary, low-cost circuitry comprising but a small number of parts.

An object, furthermore, is to devise the telemetering transmitter in such a manner as to obtain an asymptotic rather than an abrupt rise in output amplitude when an "on" signal is being initiated, thus essentially contributing to the above-mentioned prevention of spurious cross-keying of adjacent channels.

It is also an object of my invention to provide each telemetering station with power-supply units, transmitter units and/or receiver units that are all of the same exterior mounting size and permit virtually instantaneous mounting and electrically connecting of any desired number of transmit and/or receive units, up to the available maximum, in any desired grouping relative to one another and relative to a common power supply unit on a prewired mounting frame; and to make all signal input and output connections of the transmit and receive units as well as the power connections and operating controls readily accessible from the front of the mounted assembly.

Another object of the invention is to combine all frequency-determining components of each transmitter and receiver unit into a subassembly detachable as a whole from the other components of the unit to permit adapting each unit to a desired tone frequency simply by selection of the proper oscillatory subassembly.

The foregoing and other objects and advantages of the invention as well as the essential features by virtue of which they are achieved, these features being set forth in the claims annexed hereto, will be apparent from, and will be set forth in, the following description in conjunction with the accompanying drawings in which—

FIGS. 1, 2 and 3, placed side by side with FIG. 1 at the left, form together a complete circuit diagram of a two-way telemetering system according to the invention.

FIG. 5 is a functional block diagram relating to one of the two telemetering channels according to FIGS. 1 to 3.

Figure 6:
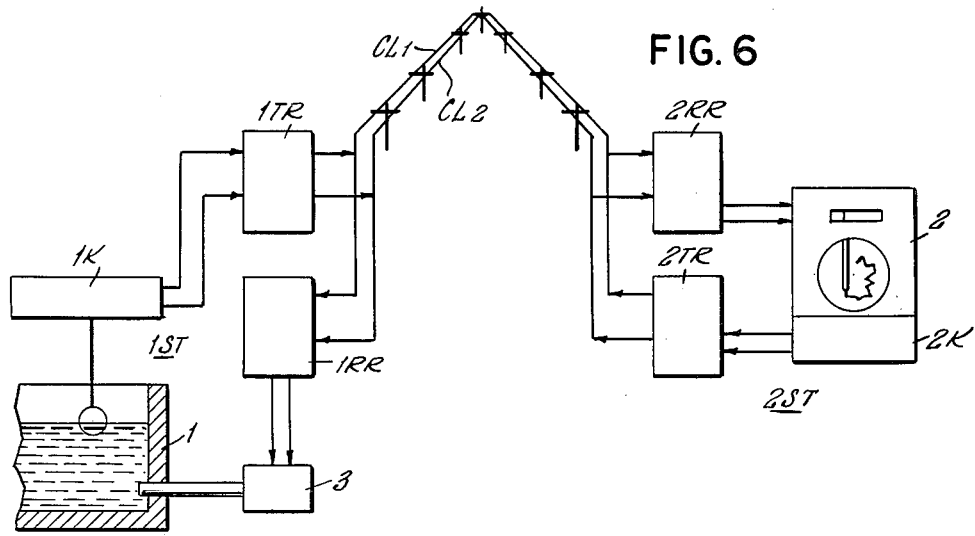
FIG. 6 represents schematically an example of a telemetering system according to FIGS. 1 to 5 applied for remote indication and control of a liquid level.
Figure 7:
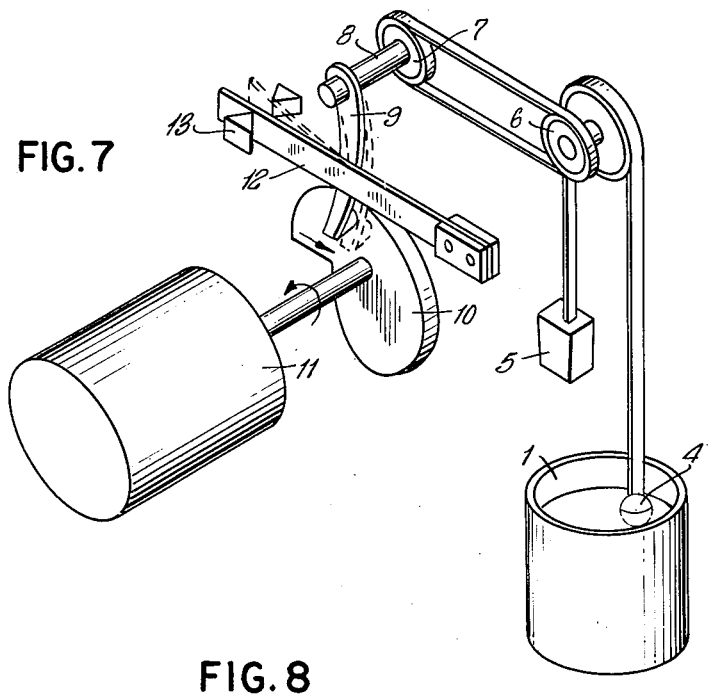

FIG. 7 exemplifies one of the possibilities of supplying on-off keying signals to a transmitter unit of a system according to the invention employed for remote indication of a liquid level according to FIG. 6.

Figure 8:
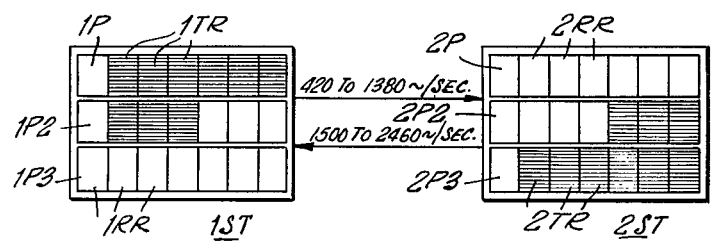

FIG. 8 is a functional block diagram exemplifying an 18-channel system according to the invention.

Figure 9:
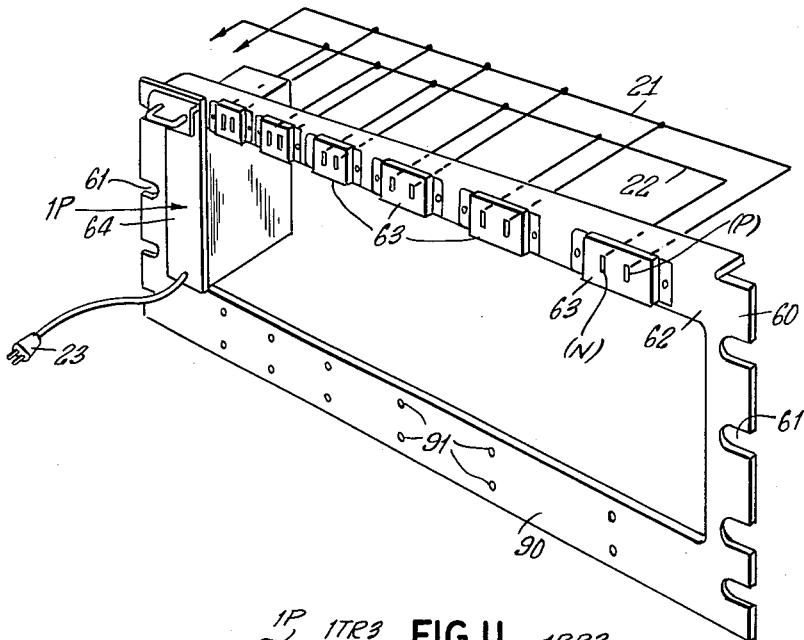

FIG. 9 is a perspective view of one of the mounting frames in a telemetering station.

FIG. 10 shows in schematic perspective one of the transmitter units mountable on the frame of FIG. 9.

Figure 11:
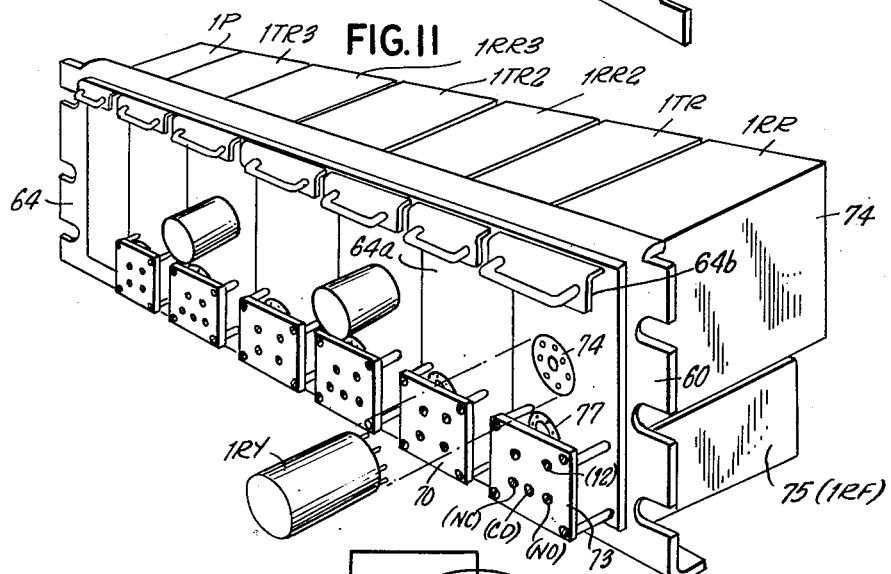

FIG. 11 illustrates the same mounting frame equipped with one power unit for energizing a selected combination of three transmitter units and three receiver units.

FIG. 12 is a section through part of one of the receiver units.

Figure 13:
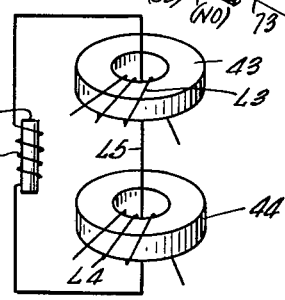

FIG. 13 is a schematic diagram of a single-turn inductive link between the two inductance members of two oscillatory circuits in the receiver unit.

FIG. 14 is a side view of the assembled components of a filter subassembly which forms part of each receiver unit; and FIG. 15 is a typical response curve of the receive filter.

Before describing details and essential features of the invention proper, it will be helpful to briefly consider the example of application illustrated in FIG. 6. According to FIG. 6 the changes of water level in a reservoir 1 are to be transmitted from a first telemetering station 1ST through an available communication channel, here shown as a two-wire telephone line CL1, CL2, to a recorder 2 in a second station 2ST. A keying device 1K in station 1ST translates the water-level changes into periodic on-off closures of an electric circuit which keys a tone frequency transmitter 1TR thus issuing to the line L1, L2 a sequence of on-off wave trains of the tone frequency. A tone frequency receiver 2RR in station 2ST re-converts the intermittent wave trains into on-off actuation of a relay which controls the recorder 2. When the level in the reservoir falls below a predetermined value, a keying device 2K in station 2ST is actuated either by an attendant, or automatically by means of auxiliary contacts within the recorder mechanism. The keying device 2K controls a second transmitter unit 2TR to issue to the same communication line CL1, CL2 a sequence of on-off wave trains of a different tone frequency. These wave trains are translated by a second receiver unit 1RR in station 1ST into on-off actuation of a relay which in turn controls a pump 3 to fill the reservoir up to the desired level.

The keying devices for use in a system according to the invention are essentially switches which open and close an electric circuit. The particular details of the keying devices are not essential to the invention as they may consist of any switch, limit switch, or other transducing device which converts mechanical motion or quantity into equivalent circuit closures. An example of such transducing device suitable for translating changes in water level into cyclical on-pulses of different duration will be described with reference to FIG. 7.

The vertical position of a float 4, counterbalanced by a weight 5, is transmitted by pulleys 6, 7 to the rotatable shaft 8 of a trip arm 9. A shoe at the end of trip arm 9 rides on the side of a cam 10 continuously kept rotating by a drive motor 11 of constant speed. Cam 10 completes a full rotation within a fixed period, for instance of fifteen seconds. Consequently, the trip-arm shoe is caused to ride up on the side of the cam once each fifteen seconds and by so doing forces a switch lever 12 to move from its dotted position to the solid-line position, thus closing a switch contact 13 for the duration of the time that the shoe rides on the cam. For any one position of trip arm 9, determined by the vertical position of float 4, a series of cyclic on-off pulses is available at the switch contact so that the duration of the on-period is proportional to the level of liquid in the reservoir.

For example, a rise in liquid level will mechanically displace the trip arm 9 laterally to the dotted position, moving the trip arm closer to the cam shaft. This increases the length of the on-pulses, for example, from eight seconds to thirteen seconds. The variable-duration pulse is fed to the transmitter unit 1TR where it is converted to audio-tone pulses or wave trains as will be more fully described below with reference to FIG. 1.

At the receiving end, the tone signals are converted by receiver 2RR (FIG. 6) into opening and closing of a relay which controls the recorder 2. Such recorder control, being known as such, may be effected by two magnetic clutches continuously driven in opposite directions and selectively energized by the opening and closing of the relay to position a pointer or pen element of the instrument. While such known clutch mechanism is not illustrated, the relay for controlling its operation will be described below with reference to FIG. 3.

In the following description of the circuit diagrams shown in FIGS. 1 to 4, correlated numerical examples of electric parameter values are given in parentheses; but it should be understood that these values are presented only by way of example and can be modified depending upon the requirements or preferences of any particular application.

As will be more fully described below, one of the essential features of the invention resides in the design of the various system components in the form of subassembly units which are joined with a mounting frame or with each other by means of plug-in connections for the purpose of affording variety in number, arrangement or frequency response of the units. Such plug-in connections are represented in FIGS. 1 to 4 by the symbol of a reference character within a circle. Thus, (P) and (N) denote plug-in connections for power supply; or (1), (2) and (11), (12) denote plug-in connections joining the respective transmitter or receiver units with the communication line.

Figure 1:
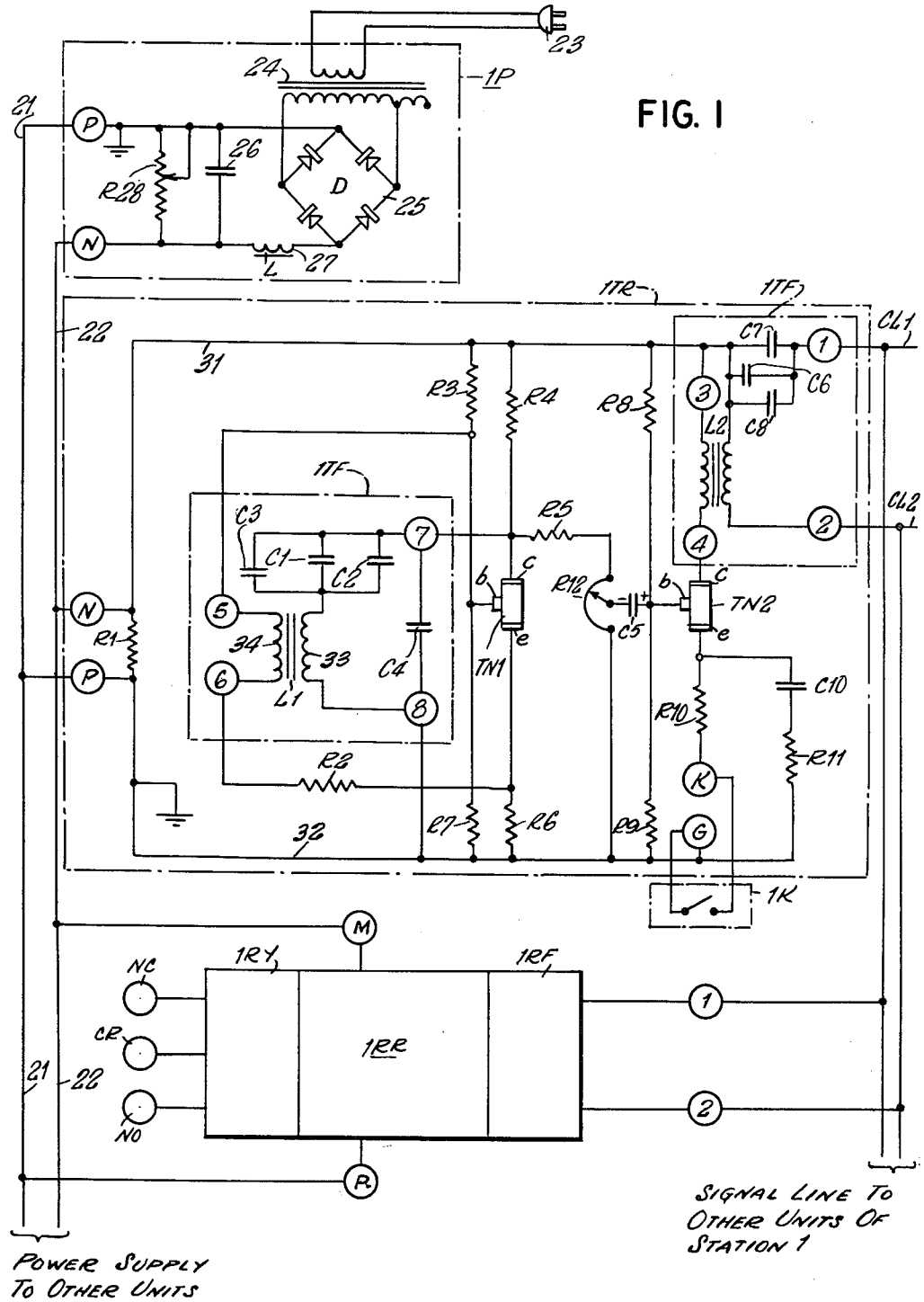

All components located in the first telemetering station 1ST according to the schematic diagram of FIG. 6, are illustrated in FIG. 1. These main components in station 1ST comprise a power supply unit 1P, a transmitter unit 1TR controlled by the above-described keying device 1K, and a receiver unit 1RR. The three units 1P, 1TR and 1RR are removably and exchangeably mounted on a common mounting frame which, if desired, may also accommodate additional transmitter or receiver units in any desired combination and up to a given maximum number to be energized from the single power supply unit 1P.

The power supply unit 1P supplies the power buses 21, 22 of the mounting frame with direct current (24 volts) from an alternating-current supply line to which the unit is connected through a flexible cord and a plug 23. Energized from the input transformer 24 of the unit is a full-wave rectifier bridge 25 whose output circuit comprises a smoothing filter composed of a shunt capacitor 26 and a series reactor 27. An adjustable load rheostat 28 is connected across the filtered output voltage which is applied to the plug terminals (P) and (N) that removably connect the power unit 1P to the above-mentioned buses.

The above-described power supply unit, as regards interior circuitry and operation, is conventional; and it should be understood that other power supply units capable of converting alternating line current into direct current of the desired voltage are likewise applicable. It may be mentioned, however, that a system according to the present invention does not impose exacting requirements upon the degree of constancy required of the direct current, because any remaining ripple voltage has no appreciable effect upon the reliability of the tone-frequency carrier transmission of the system as will be explained in a later place.

Figure 3:
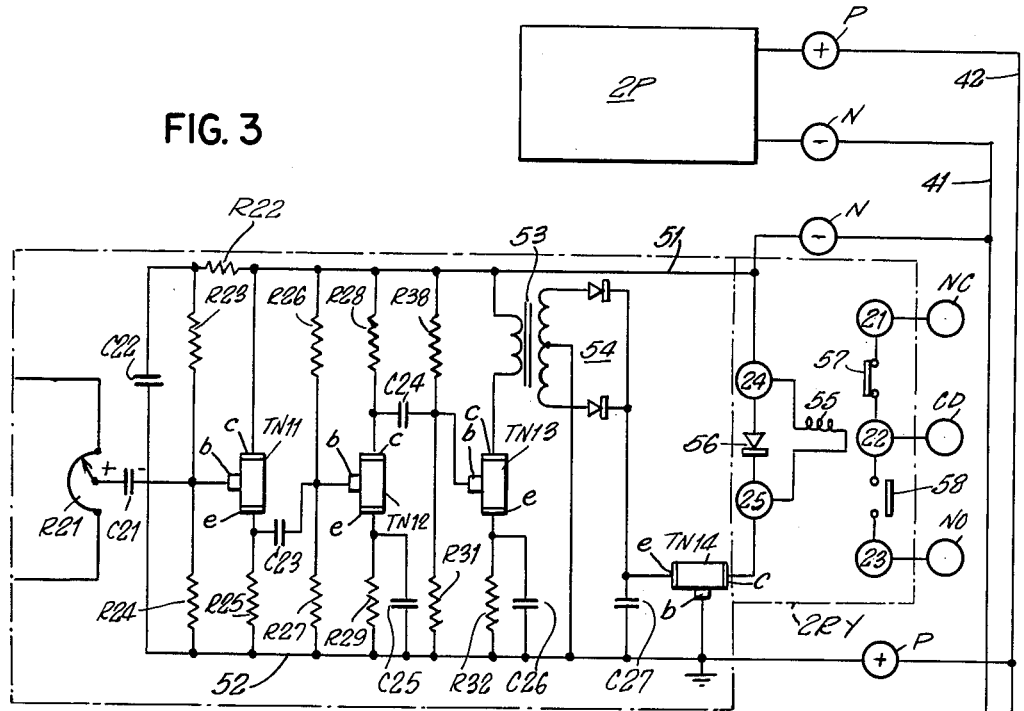

The transmitter unit 1TR is equipped with two junction-type transistors TN1 and TN2 which, like all other transistors of the system, may consist of p-n-p germanium transistors. In FIGS. 1 to 3, the collector electrodes of the respective transistors are denoted by $c$, the emitter electrodes by $e$, and the base electrodes by $b$.

In transmitter unit 1TR, the collector lead 31 of both transistors is connected to the plug-in power terminal (N) of that unit, and the emitter lead 32 is grounded and connected to the plug-in power terminal (P), a load resistor R1 (1500 ohm) being connected across the unit terminals (N) and (P).

The base $b$ of transistor TN1 receives biasing potential from the quiescent point of a voltage divider which extends between the negative emitter lead 31 and the grounded positive collector lead 32 and is formed by two resistors R3 (68,000 ohm) and R7 (4700 ohm). The collector circuit includes a resistor R4 (10,000 ohm). The emitter is grounded through an emitter-follower resistor R6 (1500 ohm).

The base $b$ of transistor TN2 receives bias potential from the quiescent point of a voltage divider extending between leads 31 and 32 and formed of two resistors R8 (15,000 ohm) and R9 (4700 ohm).

The output of the TN1 transistor stage appears across the collector and ground in a resistance circuit including a resistor R5 (22,000 ohm) in series with a potentiometer rheostat R12 (25,000 ohm). The transistor TN2 is coupled to the adjustable tap of rheostat R12 through a coupling capacitor C5 (10 mfd.).

The transistor TN1 forms part of an oscillator section that determines the particular audio carrier frequency of the transmitter, whereas the transistor TN2 forms part of an output section which superimposes on-off signals upon the tone frequency and issues the modulated wave trains to the communication channel. The oscillator section is provided with an oscillatory circuit which comprises three parallel connected capacitors C1, C2 (10,000 mmf. each, for 420 c.p.s.), and C3 (2000 mmf., for 420 c.p.s.) in series with a capacitor C4 (.25 mfd., for 420 c.p.s.). The capacitor combination is connected in series with a main winding 33 of an inductance coil L1 (6.4 henry, for 420 c.p.s.) to form a tank circuit tuned to the desired tone frequency (420 c.p.s.) of the transmitter. The parallel resonant circuit just described is connected at plug-in connector (7) to the collector $c$ of the oscillator transistor TN1, whence this circuit extends to the grounded lead 32 at plug in connector (8).

An inductive link 34 on inductance coil L7 is connected in series with a resistor R2 (4700 ohm) between emitter and base of transistor TN1 to furnish a feed-back to the emitter-base circuit for supporting oscillation. When the transmitter is energized, the tuned oscillator, formed by transistor TN1 and the appertaining tank circuit and feed-back, continuously generates the transmitter tone frequency. By virtue of the tuned-base and grounded-emitter connection in conjunction with the grounded tank circuit, the frequency of oscillation is stabilized and independent of changes in temperature.

The connection of inductive link 34 at the emitter rather than to ground reduces the loading of the transistor TN1 on the resonant circuit and permits the oscillator output frequency to be close to the resonant frequency of the parallel resonant circuit.

The presence of resistor R2 also contributes to minimizing the loading imposed by the transistor TN1 upon the resonant circuit. The capacitor C4 on the one hand and the capacitors C1, C2 and C3 on the other hand provide between them a tapped output point at plug-in connector (7), to which the collector of transistor TN1 can be coupled without reducing the quality factor Q of the resonant circuit.

The above-described oscillator connection in the transmitter unit provides the following outstanding features: (a) light loading of the circuit on the resonant coil-capacitor combination to let the frequency of oscillation very closely approach the natural resonant frequency of the oscillatory circuit; and (b) minimum change of oscillator frequency with changes of temperature or supply voltage. In this respect, the transmitter oscillator is superior to any of the conventional transistor-oscillator circuits heretofore available for such purposes.

The output section of the transmitter, comprising the transistor TN2, is provided with a second oscillatory circuit which comprises an inductance coil L2 (6.4 henry, for 420 c.p.s.) and capacitors C6, C7 (10,000 mmf. each for 420 c.p.s.) and C8 (1000 mmf., for 420 c.p.s.). This second oscillatory circuit serves to make the output relatively independent of the load impedance, since the resonant circuit approaches, at coil L2, a current rather than a voltage source. The second oscillatory circuit in the transmitter unit also reduces the harmonics delivered to the communication channel CL1, CL2 and suppresses inter-modulation of the output with the output of other transmitter units of different frequencies operating over the same communication medium.

Figure 4:
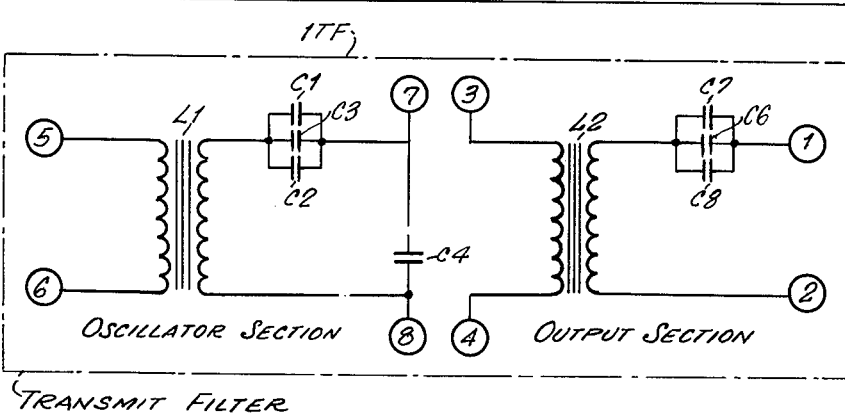
FIG. 4 shows separately the circuit diagram of a subassembly comprising two resonantly tuned oscillatory circuits within the transmitter unit shown in FIG. 1.

Although all components of the transmitter 1TR are mounted together on a single panel to form a unit, the above-described two oscillatory circuits of the transmitter are grouped and joined together to form a single subassembly 1TF, hereinafter called "transmit filter," which has its own housing and is detachable as a whole from the rest of the separately housed transmitter components by means of the plug-in connectors (1) to (8), the entire transmit-filter subassembly 1TF being separately shown in FIG. 4.

The two inductance coils L1 and L2 and their respective secondary windings are wound onto respective toroidal cores of ferromagnetic material and are mounted on a carrier to which the capacitors C1 to C4 (C5 is omitted for 420 c.p.s.) and C6 to C8 are also secured, substantially in the same manner as shown in FIG. 14 for the two toroidal-core inductance coils and the capacitors of the receive-filter subassembly described in a later place.

The above-described keying device 1K, being essentially an on-off switch, is connected in the emitter-to-ground circuit of transistor TN2 in series with a resistor R10 (2200 ohm). The connection is made by means of plug-in connectors (G) and (K) of which the connector (G) is grounded by lead 32. A circuit, comprising a capacitor C10 (5 mfd.) and a resistor R11 (100 ohm), is connected between the grounded connector (G) and the emitter of transistor TN2.

This particular keying connection has the effect of keeping the capacitor C10 charged when the transmitter unit is keyed "on," so that upon closing of the keying contact, the collector current rises asymptotically toward its ultimate value as determined by resistors R9 and R10, rather than jumping steeply to a very high initial value which would occur if capacitor C10 were uncharged. Such high initial value of collector current would result in a correspondingly high initial output amplitude at the closing moment of the keying contact 1K and thus would trigger adjacent tone-frequency channels. Consequently, this particular keying connection, in co-action with the filtering effect of the C6—C7—C8—L2 oscillator circuit of the transmitter reliably eliminates spurious cross-keying of adjacent tone-frequency channels.

As mentioned, the oscillator section including transistor TN1 is continuously effective to generate the carrier tone, but the tone is not transmitted to the communication line until the amplifier section of transistor TN2 is turned on by closure of the keying device 1K since the emitter-to-ground circuit of transistor TN2 is normally open and is completed through the external keying leads. When keyer 1K closes, the transistor TN2 is permitted to amplify the tone-frequency appearing across the tapped-off portion of the signal-level adjusting rheostat R12, and the amplified tone is applied to the collector transformer L2 of the amplifier and is coupled to the narrow pass-band filter that includes the secondary of the transformer. Here the filtered tone is issued to the communication line without intermodulation with other frequencies on the same line.

The on-off tone-frequency wave trains issuing from the transmitter 1TR at terminals (1), (2) to the communication line CL1, CL2 are received in the second telemetering station, illustrated in FIGS. 2 and 5, by a resonant receiver 2RR which comprises a multi-stage transistor amplifier, a filter sub-assembly 2RF and a relay sub-assembly 2RY. The two sub-assemblies, although mounted together with the transistor amplifier upon a single mounting plate to form a single unit, are detachably and exchangeably joined with the transistor amplifier section by plug-in connectors (11) to (14) and (21) to (25) similar to those described with reference to FIG. 1. The receiver 2RR is energized from a power supply unit 2P which corresponds to that described above with reference to unit 1P in FIG. 1 and is connected by plug-in connectors (P) and (N) with the interwired other power connectors (P) and (N) of the same mounting frame.

As is the case with the transmit filter 1TF described above, the receive filter 2RF of receiver 2RR comprises two oscillatory circuits inductively linked with each other and combined within a separate housing to form a subassembly which is exchangeably connected with the amplifying portion of receiver 2RR by means of the above-mentioned plug-in connectors (11) to (14).

The first oscillatory circuit of receive filter 2RF comprises a series connected capacitor C11 (5600 mmf.) and three parallel capacitors C12 (10,000 mmf.), C13 (5600 mmf.) and C14 (100 mmf.). Capacitors C12, C13 and C14, together with an inductance coil L3 (6 henry), form a parallel resonant circuit tuned to the center frequency of the transmitter 1TR. The second oscillatory circuit of the receive filter 2RF comprises an inductance coil L4 (6 henry) which forms a parallel-resonance loop circuit together with capacitors C15 (10,000 mmf.), C16 (10,000 mmf.), C17 (5600 mmf.) and C18 (.22 mfd.). This second oscillatory circuit is likewise tuned to the tone frequency of the transmitter (420 c.p.s.).

Each of the two inductance coils L3 and L4 has its own ferromagnetic core and is linked with the other coil by a one-turn link L5 which comprises an inductance member L6. The link serves as a mutual impedance in the coupled circuits and determines the shape of the response curve.

The capacitor C18 is a low impedance member which provides the output between the plug-in terminals (13) and (14). For temperature compensation of the units in order to keep the frequency to which they are tuned constant as the temperature varies, either coils L3 and L4 are wound onto a core of temperature compensated material, or a sufficient portion of capacitors C12, C13 and C14, together with C15, C16 and C17, comprises a dielectric of a negative temperature coefficient, to accomplish the desired result.

The nature of the above-mentioned one-turn link L5 between inductance coils L3 and L4 will be more fully understood by reference to FIGS. 13 and 14. According to FIG. 13, showing only a few turns of inductance coils L3 and L4, these two coils are wound upon respective toroidal cores 43 and 44 of ferromagnetic material. The one-turn loop circuit L5 passes through the openings of both cores and comprises the inductance winding L6 on its own ferromagnetic core 46. The three coils L3, L4, L5 as well as the capacitors C11 to C18 of the subassembly 2RF are all mounted on a common carrier plate 47 (FIG. 14) and are shielded by a housing 48 separate from the housing of the transistor amplifier section of receiver 2RR still to be described.

The above-described combination of two oscillatory circuits interlinked by a loose inductive coupling at their respective inductance components secures an extremely high selectivity with an unusually small number of parts. This selectivity is evidenced by the example of the frequency response curve illustrated in FIG. 15. The abscissa of FIG. 15 denotes the frequency in cycles per second, the ordinate indicates attenuation in decibels. The particular curve illustrated refers to a tone frequency of 420 c.p.s. and to an input level set at zero decibels. Because of its sharp-notch two-stage toroidal design, the filter subassembly is extremely selective to such a degree that at the half-power point (—3 decibels) its band width is only about nine cycles wide as is apparent from FIG. 15. This characteristic isolates the receiver from random noise of the transmission medium and secures excellent signal-to-noise performance. Besides, the filter input impedance at the tone frequency of 420 c.p.s. is low, namely about 4000 ohms, but is very high at all other frequencies.

As mentioned above, the design and mounting of the two toroidal-core inductance coils and the capacitors of the transmit-filter subassembly (FIG. 4), are similar to the receive filter just described.

The transistor circuits of the receiving amplifier section are energized at connectors (N) and (P) from power supply unit 2P through two bus wires 41, 42 on the mounting frame. The connectors (N) and (P) of unit 2RR supply negative direct voltage (—24 volt) to the collector lead 51, and grounded positive voltage to the emitter lead 52 of the amplifier section. The filtered tone-frequency waves are taken from across a tapped-off portion of a signal-level adjusting rheostat R21 (25,000 ohm) connected across the connectors (13) and (14). A coupling capacitor C21 (10 mfd.) connects the tap of rheostat R21 with the base $b$ of the first-stage transistor TN11. The base of transistor TN11 receives biasing potential from a voltage divider extending across leads 51 and 52 and comprising a resistor R23 (100,000 ohm) and a resistor R24 (33,000 ohm). The voltage divider is shunted by a capacitor C22 (30 mfd.).

The transistor TN11 is essentially a grounded-emitter input stage. The amplifier further comprises a grounded-emitter amplifier stage including a transistor TN12, a grounded-emitter driver stage including a transistor TN13, and a grounded-base power stage which includes a transistor TN14 and operates the above-mentioned contact relay 2RY.

The emitter of the first-stage transistor TN11 is connected to grounded lead 52 through a resistor R25 (10,000 ohm). The emitter of the pre-amplifying transistor TN11 is coupled through a coupling capacitor C23 (10 mfd.) with the base of amplifying transistor TN12 which receives bias potential from a voltage divider formed between leads 51 and 52 by two resistors R6 (22,000 ohm) and R7 (3300 ohm).

The emitter of amplifying transistor TN12 is grounded through a resistor R29 (1000 ohm) that is shunted by a capacitor C25 (60 mfd.). The collector of transistor TN12 is connected to positive lead 51 through a resistor R28 (4700 ohm). The base of driver transistor TN13 is coupled to the collector of transistor TN12 through a coupling capacitor C24 (10 mfd.) and receives bias potential from voltage dividing resistors R30 (10,000 ohm) and R31 (3300 ohm). The emitter of driver transistor TN13 is grounded through a resistor R32 (1500 ohm) shunted by a capacitor C26 (30 mfd.). The collector circuit of driver TN13 comprises the primary of a transformer 53 which energizes a full wave rectifier 54. The direct-current output circuit of rectifier 54 is grounded by connection with the emitter lead 52 and is connected between emitter and base of power control transistor TN14 which operates as a switching resistor and has a filtering capacitor C27 (60 mfd.) connected between emitter and base. The output circuit of the switching transistor, extending between its collector and the positive lead 51, terminates at plug-in connectors 24 and 25 which establish a connection with the detachable relay subassembly 2RY.

The relay subassembly 2RY has the control coil 55 of an electromagnetic relay connected between plug-in connectors 24 and 25 and paralleled by a half-wave rectifier 56. The electromagnetic relay has a normally closed contact 57 connected between plug-in terminals (21) and (22), and a normally open contact 58 between the center terminal (22) and another plug-in terminal (23). When coil 55 is energized, contact 57 opens and contact 58 closes, thus permitting the control of a normally closed load circuit to be connected between terminals (NC) and (CD), and of a normally open load circuit to be connected between terminals (CD) and (NO).

The amplifying section of receiver 2RR unit operates as follows:

The first transistor stage TN11 is operated as a grounded emitter in order to provide a high input impedance and to minimize the filtering requirements of the power supply. Any ripple in the power supply, which is used to bias the first-stage transistor, could entirely mask the signal if the ripple effect were not overcome. Resistors R22, R23, R24 and capacitor C22 provide a decoupling and biasing network for transistor TN11, which takes the ripple, present in the power supply, out of the first-stage transistor bias voltage. With no power-supply ripple present at the base of transistor TN11, no ripple can be present at its emitter since this stage operates as an emitter-follower stage. With no ripple present at the emitter of TN11, there can be no power-supply ripple present at the base of transistor TN12. The earliest point at which the power-supply ripple can be present is at the base of the driver transistor TN13 since there can be none at the collector of TN2 because of the high collector impedance of transistors and the lack of power-supply ripple at the base of transistor TN12. In the driver stage, however, the amplification of the signal has reached the high level at which it is active upon the base of transistor TN13, and this amplified signal is much larger than any possible ripple at the base of the latter transistor.

By virtue of the fact that the grounded-emitter transistor TN11 provides for high input impedance, it also functions to prevent loading of the output capacitor C18 of the receive filter 2RF. The input impedance of the grounded-emitter stage, as exemplified in the foregoing, is in the order of 10,000 or 15,000 ohms as determined by the parallel combination of resistors R21 and R24.

The alternating-current signal voltage applied to the collector of the driver transistor TN13 is converted by transformer 53 and rectifier 54 to direct current and is filtered by capacitor C27, so that when there is a signal present at the amplifier input stage, a direct-current voltage appears at the common terminal of capacitor C27 and rectifier 54. This direct-current voltage turns the switching transistor TN14 on, and thus operates the relay RY1 in the manner above described.

The grounded base stage used for switching transistor TN14 obviates the temperature problems which would arise in reaching a minimum collector current if a grounded-emitter stage were used at that point. It will be recognized that transistors TN11, TN12 and TN13 are alternating-current amplifiers, whereas the transistor TN14 is a direct-current amplifier which would have temperature-stabilization difficulties if a grounded-emitter stage were used.

The above-described features of the receiver contribute to providing an unusually high degree of reliability and selectivity notwithstanding the relative simplicity and small over-all dimensions of the device. It is an outstanding advantage that the receiver permits a relatively high value of power-supply ripple to be used in a very sensitive amplifier without detriment to the performance. The use of a transformer coupling over to a grounded base stage secures temperature-independent D.-C. amplifier operation; and a very high power gain is achieved with relatively few transistors. The power gain can be calculated from the requirement that the output, to operate the relay 2RY (in an embodiment involving the parameter values above exemplified in parentheses) was 200 milliwatts or plus 23 decibels. The input signal accepted by the receiver unit was minus 60 decibels, so that the actual power gain was 83 decibels. As also mentioned, the entire system is of extreme selectivity due to the above-described features of the filter components used, thus improving the reliability of operating with as many as eighteen different tone frequencies within a range of 420 and 2460 c.p.s.

In accordance with the example of application illustrated in FIG. 6, the telemetering station illustrated in FIGS. 2 and 3 is shown equipped with another transmitter 2TR which comprises a keying device 2K and a transmit filter 2TF for issuing signals through the same communication channels CL1, CL2 to a receiver 1RR, located in the other station, which comprises a receive filter 1RF and a relay 1RY. It will be understood that the transmitter 2TF and the receiver 1RR are electrically identical with the above-described transmitters 1TF and receiver 2RR respectively, except that the two oscillatory circuits in each of these two units are tuned to a tone frequency different from that of the first-described pair of transmit and receive units.

As mentioned, the various component units of the system, namely power supply units, transmitter units and receiver units, are mounted in each station on a mounting frame common to a number of such units. In view of the fact that a total of eighteen tone frequencies are available within the customary range of 420 to 2460 c.p.s., each station is provided with at least one mounting frame of elongated rectangular shape and sufficient size to accommodate any desired combination of six transmitter or receiver units together with one power supply unit common to the six other units. For this purpose, and as more fully explained below, the front plates of all of the three types of units have the same over-all width and height and are joined by means of identical plug-in connections so as to permit placing them onto the mounting frame in any desired number, combination and arrangement. For accommodating eighteen channels of respectively different tone frequencies within a single station, a mounting rack is preferably used which carries three individual mounting frames, each with its own power supply unit as is schematically exemplified in FIG. 8.

According to FIG. 8, each of the two stations 1ST and 2ST comprises three horizontal mounting frames each having its own power supply unit 1P, 1P2, 1P3 or 2P, mitters, all denoted by 1TR, which cooperate with nine respective receivers 2RR in station 2ST at equally spaced tone frequencies between 420 and 1380 c.p.s. Station 1ST is further equipped with nine receiver units 1RR for cooperation with nine transmitter units 2TR in station 2ST at tone frequencies between 1500 and 24,600 c.p.s.

An individual mounting frame as described above is illustrated in FIG. 9 where it is denoted by 60. The mounting frame consists of a sheet-steel structure of rectangular shape which has marginal notches or bores at 61 for fastening the frame to a supporting rack. The top bar 62 of the frame structure carries seven two-pole socket members 63 of identical design. The two sockets (P) and (N) of each member 63 correspond to the plug-in terminals (P) and (N) shown in FIG. 1 to FIG. 3. The sockets (P) are all wired together by a common lead 21, and the sockets (N) are wired together by a lead 22, corresponding to respective leads 21 and 22 in FIG. 1. While in FIG. 8 these leads are shown separated from the mounting frame 60, they are actually located immediately behind the back of the top bar 62.

If desired, a connector strip 90 may be mounted beneath frame 60 to carry six two-pole sockets 91 which are interwired and connected to the communication line CL1, CL2 (FIGS. 1, 2) to facilitate making all communication-line connections by plug-in connectors at the front of the frame.

The mounting frame 60 in FIG. 8 is shown provided with a power control unit 1P. This unit, as well as all transmitter or receiver units to be mounted, is simply attached and electrically connected by pushing the corresponding male plug member into the sockets of the selected coupling member 63 until the front plate 64 of the unit lies flush against the top and bottom bars of the frame. The power supply unit 1P may be mounted at any one of the available seven locations of the frame, and the remaining locations may be occupied by any desired combination of transmitter or receiver units.

FIG. 10 illustrates one of the transmitter units. The mounting plate 64a of this unit, as well as the corresponding plate of all respective other units, has the same height and width as the above-mentioned front plate 64 of the power supply unit; and the male plug member 65 of all respective units is located at the top of the mounting plate which, at its front, is provided with a handle 66 for attaching or removing the unit. The components of the transmitter unit, with the exception of the tranmit filter 1TF (FIG. 4) are firmly joined with the front plate 64a and are enclosed by a housing or can 67 of metal. The components of the appertaining transmit filter 1TF are separately mounted on a carrier similar to the one denoted by 47 in FIG. 14 and are enclosed within a second housing or can 68 (FIG. 10) of sheet metal. Subassembly 1TF is mounted on plate 64a by means of the appertaining connector pins which enter into respective sockets of a female connector member 69 mounted on plate 64a, these connector pins and sockets corresponding to the plug-in connections denoted by (1) to (8) in FIG. 1. The mechanical design of the plug-in connectors for the transmit filter is similar to that described below with reference to FIG. 12.

Mounted on plate 64a but in spaced relation thereto is a small front panel 70 which is held in position by bolts 71 and spacer sleeves 72. Front panel 70 carries the communication-line connector terminals (1) and (2) and also the terminals (G) and (K) for connection of the keyer (1K in FIG. 1).

FIG. 11 shows a mounting frame 60 equipped with a power supply unit 1P, three transmitter units 1TR, 1TR2, 1TR3, and three receiver units 1RR, 1RR2, 1RR3.

Since the individual units are plug-in connected and since any unit may be plugged into any position on the mounting frame, any desired modification of the arrangements may be made. For example, it may be necessary to have five indicating channels corresponding to the channel between 1TR and 2RR in FIG. 6, but only one control channel corresponding to 2TR—1RR in FIG. 6. For this purpose, the mounting frame in the central office or station 2ST is provided with five receiver units and one transmitter unit powered by a common power supply unit, whereas the remote station 1ST contains five transmitter units and one receiver unit powered by a common power supply unit.

The mounting plate 64b (FIGS. 11, 12) of each receiver unit is also provided with a small front panel 73 essentially corresponding to panel 70 of the transmitter unit described above with reference to FIG. 10, except that panel 73 carries the communication-channel terminals (11), (12) and the relay terminals (NC), (CD), (NO). The relay subassembly 1RY, corresponding to relay 2RY in FIG. 3 or relay 1RY in FIG. 1, is provided with its own metal housing or can and is joined with the receiver unit by having its five plug pins (21) to (25) engage a female socket member 74 (FIG. 11) mounted on front plate 64b.

The amplifier station of the receiver is firmly connected with plate 64b and is enclosed by a sheet metal housing 74 also secured to plate 64b. The oscillator section 1RF (corresponding to oscillator section 2RF in FIG. 2) has its own metal housing 75 and is joined with plate 64b by connecting plugs engaging the sockets of another female connector member 77 which is likewise mounted on plate 64b as will be more fully apparent from the detail shown in FIG. 12.

The cam 48 of the receive filter carries at its bottom four bolts 78 of which only one is visible in FIG. 12. The bolts pass through respective bores in mounting plate 64b. Each bolt engages the threaded bore of a spacer sleeve 79 to which the front panel 73 is attached by means of another bolt 80. The bottom of can 48 carries an insulating base 81 with four soldering lugs 82 for attachment of the wires leading to the connectors denoted by (11) to (14) in FIG. 2. Secured to the insulating body 81 are four plug pins of which two are visible in FIG. 12 and denoted by 11, 12 corresponding to the communication channel connectors (11) and (12) in FIG. 2. The socket sleeves of member 77 are electrically connected with the terminals mounted on front plate 73 and with the amplifier circuits mounted on plate 64b in accordance with the circuit diagrams of FIGS. 2 and 3.

To illustrate the compact design and small size of telemetering stations according to the invention, it may be mentioned that in systems built in accordance with the above-described example, the size of each mounting plate (64, 64a, 64b) is 4½ x 2 inches, requiring a horizontal length of each mounting frame 60 of 19 inches for accommodating a total of seven units, namely one power supply unit and six transmitter and/or receiver units.

Such systems are applicable for any telemetering purposes requiring the transmission of data from one station to another station or central office, for example, in water works, sewage treatment plants, chemical industries, process industries, canneries, gas and oil pipe lines, refineries, well fields, mining operations, steel plants, electric power sub-stations, radio and television broadcasting stations, fertilizer plants and others.

While in the above-described example reference is made to transmission with a maximum of eighteen communication channels over a single communication medium within the frequency range of 420 and 2460 c.p.s., it is obvious that by extending the frequency range, the number of available communication channels can be increased, or that the available number of communication channels may be distributed over more than one communication medium such as two or more telephone circuits. The invention also permits the use of keying devices in form of totalizers in which a number of similar functions are summated and are supplied into a telemetering transmitter unit as a single signal so that a number of functoins, which are not independent but are collectively important, can be monitored over a single transmitter-receiver tone-frequency channel. When using keying devices designed as time-sharing equipment, a large number of functions can be sequentially transmitted over each individual tone-frequency channel, thus also permitting an increase in the various functoins or data that can be transmitted.

It will be obvious to those skilled in the art, upon studying the present disclosure, that my invention permits of various modifications as regards circuitry and design of the system and its individual components without departing from the essential features of my invention and within the scope of the claims annexed hereto.

I claim:

1. In a multiplex telemetering system comprising mutually remote stations, the combination of a horizontally elongated and substantially rectangular mounting frame in each station, a number of mutually similar power outlets mounted on said frame and horizontally aligned at equal distances from each other, said outlets being electrically interwired on said frame in parallel connection with each other; transmitter and receiver units, a rectifying power supply unit for energizing said interwired power outlets; said power supply unit and said transmitter and receiver units having each a plug-in connector mating each of said power outlets so that said power supply unit is selectively connectable on said frame with any one of said outlets to energize all said outlets, and any combination of transmitter and receiver units is connectable on said frame with the other outlets; and each of said transmitter and receiver units having further connector means for connection to a communication channel between said stations.

2. In a multiplex telemeterizing system with mutually remote stations, each of said stations comprising a plurality of vertically sequential mounting frames, each frame being substantially rectangular and horizontally elongated and having respective upper and lower horizontal frame portions, a number of mutually similar power outlets mounted on said upper frame portion and horizontally spaced equal distances from each other, said outlets being electrically interwired in parallel connection with each other; transmitter and receiver units, a rectifying power supply unit for energizing said interwired power outlets; said power supply unit and said transmitter and receiver units having each a vertical mounting plate overlapping said upper and lower frame portions when said unit is mounted on said frame, each of said units having a plug-in connector mounted on said plate near the top and at the rear thereof, said connector mating said outlets so that said power supply unit is selectively attachable to said frame by plugging its connector into any one of said outlets to energize all of said outlets, and any of said transmitter and receiver units are attachable mechanically and electrically to said frame by plugging their respective connectors into the other outlets; each of said units having an assembly of components mounted on said plate and protruding through said frame to the rear thereof when the unit is attached to said frame; and each of said transmitter and receiver units having further connector means mounted on said plate and accessible at the front of said plate for connection to an inter-station communication channel.

3. In a telemetering system according to claim 2, each of said transmitter and receiver units having a tuned filter and having transistor-network components electrically connected with said filter, said network components being fixed on said mounting plate, said plate and said filter having respective plug-in means mating each other and exchangeably joining said filter with said plate and said network components, a housing enclosing said network components and fixed to said mounting plate at the rear side thereof, and a second housing enclosing said filter at the rear side of said plate independently of said first housing, said plug-in means of said filter being firmly joined with said second housing for exchangeably mounting said second housing on said plate.

4. In a telemetering system according to claim 2, each of said transmitter units having a keying circuit and having two terminals mounted on said mounting plate and accessible from the front of said frame, said two terminals forming part of said keying circuit to permit selective connection of keying means to said transmitter unit.

5. In a telemetering system according to claim 2, each of said receiver units comprising a contact relay to permit selective connection thereto of a load circuit to be controlled, and each of said receiver units having socket terminals mounted on said plate and accessible from the front thereof, said relay having plug-in means insertable into said socket terminals for removable mechanical and electrical attachment of said relay to said plate.

6. In a telemetering system according to claim 1, each of said receiver units comprising a mounting plate, said plug-in connector of each unit being mounted on said plate; each of said units having a tuned filter and transistor-network components electrically interconnected with said filter; said network components being fixed on said mounting plate, said plate and said filter having respective plug-in means mating each other and exchangeably joining said filter with said plate and said network components; said filter and said network components being disposed on the rear side of said plate; and a contact relay for electric connection to said network, said relay having plug-contact means and being exchangeably mounted on the front side of said plate.

References Cited in the file of this patent
UNITED STATES PATENTS

| | | |
|---|---|---|
| 1,897,633 | Dalpayrat | Feb. 14, 1933 |
| 1,946,574 | Duncan | Feb. 13, 1934 |
| 2,494,370 | Swartzel | Jan. 10, 1950 |
| 2,516,936 | Young | Aug. 1, 1950 |
| 2,533,285 | Sager | Dec. 12, 1950 |
| 2,534,261 | Gorham | Dec. 19, 1950 |
| 2,537,163 | Shenk | Jan. 9, 1951 |
| 2,586,427 | Hagenau | Feb. 19, 1952 |
| 2,602,842 | Morris | July 8, 1952 |
| 2,662,933 | Singer | Dec. 15, 1953 |
| 2,672,600 | Cary | Mar. 16, 1954 |
| 2,784,393 | Schultheis | Mar. 5, 1957 |
| 2,894,077 | McCoy | July 7, 1959 |

OTHER REFERENCES

Curry: "Mobile FM . . . for Railroads," published in Tele-Tech., November 1948, pages 56 and 57.

Communications Engineering, vol. 14, No. 1, January-February 1954, pages 16 and 17.